UNITED STATES PATENT OFFICE.

FREDERICK M. BECKET, OF NIAGARA FALLS, NEW YORK, ASSIGNOR TO ELECTRO METALLURGICAL COMPANY, OF NEW YORK, N. Y., A CORPORATION OF WEST VIRGINIA.

METHOD OF PREPARING TUNGSTEN AND ALLOYS THEREOF.

1,081,568.      Specification of Letters Patent.      Patented Dec. 16, 1913.

No Drawing.      Application filed October 29, 1912. Serial No. 728,499.

*To all whom it may concern:*

Be it known that I, FREDERICK M. BECKET, a subject of the King of Great Britain, residing at Niagara Falls, in the county of Niagara and State of New York, have invented certain new and useful Improvements in Methods of Preparing Tungsten and Alloys Thereof, of which the following is a specification.

This invention relates to the treatment of ferrotungsten which is high in phosphorus, or in phosphorus and carbon, for the purpose of producing therefrom a metal or alloy comparatively low both in phosphorus and carbon.

According to the invention, ferrotungsten high in phosphorus or in phosphorus and carbon, hereinafter referred to simply as "crude ferrotungsten," is first subjected to an oxidizing roast having for its purpose the oxidation of the metal-content and of the carbon, either wholly or in large degree, whereby there is produced a mixture of oxids of iron and tungsten containing little or no carbon. This oxidizing roast may be performed under any desired conditions, as for example in a rotary kiln at a red heat. In case of ferrotungsten high in tungsten, preliminary grinding to a fine state of subdivision is unnecessary, since the roasted material is friable in character and usually falls apart during the roasting operation.

The roasted product, which may be referred to simply as the "mixed oxids" is then reduced to metal at a temperature below the fusing point of the reduced product, and is thereafter preferably concentrated by processes serving to remove a part or all of the iron and phosphorus. In the case of ferrotungsten which is high in carbon but low in phosphorus, this concentration may be unnecessary, since an oxidizing roast serves to eliminate most or all of the carbon, and the reduced product is adapted for direct utilization as an addition to steel and for other purposes in the arts.

In carrying out the process the mixed oxids obtained by roasting the crude or high-carbon ferrotungsten are preferably reduced by a gaseous reducing agent, as carbon monoxid or hydrogen, or by a gaseous mixture containing these, such for example as the gases from commercial furnaces for the manufacture of calcium carbid. The reduction is effected at temperatures below the melting-point of the reduced product, whereby the product is left in excellent condition for further treatment by concentration methods. For example, iron, and with it a material proportion of the phosphorus, may be removed by magnetic separation, by mechanical concentration processes, or by acid solution. The last-named method is particularly effective in that it involves no appreciable loss of tungsten and may be carried into effect in a variety of ways, for instance by leaching or digesting the reduced product with sulfuric acid of 1.2 specific gravity, followed by thorough washing with water. The activity of the acid may be somewhat increased by an increase of temperature or by disposing the reduced product as the anode, or in proximity to the anode, in the acid solution.

The processes of treating high carbon ferrotungsten above described may be regarded as portions of a complete process which involves the electric furnace reduction by means of carbon of tungsten ores or concentrates under conditions yielding a high-carbon ferrotungsten. Such reduction is efficiently and economically performed by known methods, and the processes described above afford a ready means for converting the high-carbon ferrotungsten into a product which is comparatively low both in carbon and in phosphorus. I believe myself the first to establish the fact that it is possible, by a commercial roasting operation, practically to eliminate the carbon from high-carbon ferrotungsten, converting the crude ferrotungsten into a mixture of oxids susceptible of direct treatment for the production of relatively pure metallic products.

I claim:

1. The method of preparing tungsten or its alloys, which consists in subjecting crude ferrotungsten to an oxidizing roast, reducing the resulting oxids without substantial fusion of the reduced product, and concentrating the tungsten-content of said product.

2. The method of preparing tungsten or its alloys, which consists in subjecting crude ferrotungsten to an oxidizing roast, reducing the resulting oxids without substantial fusion of the reduced product, and removing phosphorus from said reduced product.

3. The method of preparing tungsten or its alloys, which consists in subjecting crude ferrotungsten to an oxidizing roast, reducing the resulting oxids without substantial fusion of the reduced product, and removing iron and phosphorus from said reduced product by an acid-treatment.

In testimony whereof I affix my signature in presence of two witnesses.

FREDERICK M. BECKET.

Witnesses:
T. L. SECORD,
D. BURGESS.